3,455,919
5-DECHLORINATION OF 3-AMINO-5,6-DICHLORO-PYRAZINOYL COMPOUNDS

Leonard M. Weinstock, Rocky Hill, James C. Schaeffer, Union, and Dennis M. Mulvey, Iselin, N.J., assignors to Merck & Co., Inc., Rahway, N.J., a corporation of New Jersey
No Drawing. Filed Sept. 1, 1966, Ser. No. 576,546
Int. Cl. C07d *51/66, 51/76;* A61k *27/00*
U.S. Cl. 260—250                                8 Claims

ABSTRACT OF THE DISCLOSURE

A process is described for the hydrogenolysis of the 5-chloro group from 3-amino-5,6-dichloropyrazinoic acid esters and corresponding pyrazinoylguanidines and pyrazinamidoguanidines, which comprises catalytic hydrogenation. The resultant esters are starting materials for the pyrazinoylguanidine and pyrazinamidoguanidine products which themselves are useful diuretic and natriuretic agents.

---

This invention is concerned with a novel process for the preparation of 3-amino-6-chloropyrazinoic acid derivatives which are useful intermediates in the production of 3-amino-6-substituted pyrazinoylguanidines and 3-amino-6-substituted-pyrazinamidoguanidines which possess diuretic and saluretic properties.

The novel process of this invention comprises dechlorination of the 5-chloro group in a corresponding 3-amino-5,6-dichloropyrazinoic acid derivative.

In particular this invention relates to the novel process of selective catalytic hydrogenolysis of the 5-chloro group of a 3-amino-5,6-dichloropyrazinoic acid derivative to yield a 3-amino-6-chloropyrazinoic acid derivative of structural formula:

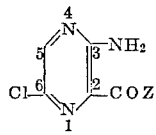

wherein Z represents:

(1) lower alkoxy of from 1 to about 5 carbons such as methyl, ethyl, propyl, butyl and pentyl, and
(2) a group having the formula

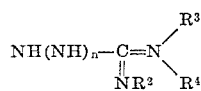

wherein:

$R^2$ represents:

(a) hydrogen,
(b) lower alkyl having from 1 to 5 carbons such as methyl, ethyl, propyl, isopropyl, butyl, pentyl and,
(c) hydroxyloweralkyl such as hydroxymethyl, hydroxyethyl, and hydroxypropyl;

$R^3$ and $R^4$ each represents:

(a) hydrogen,
(b) lower alkyl of from 1 to about 5 carbons, such as methyl, ethyl, propyl, isopropyl, butyl, and pentyl,
(c) substituted lower alkyl wherein the substituent is hydroxy, phenyl or heterocyclic such as N-octahydroazocinyl, piperidinyl, and the like,
(d) phenyl,
(e) halophenyl, such as chloro and bromophenyl,
(f) amino with the proviso that $R^2$ and $R^3$ can not both be amino.

Prior to the discovery of the novel process of this invention, the best method of preparing 3-amino-6-chloropyrazinoic acid derivatives was from the 3-amino-6-chloropyrazinoic acid ester which in turn was prepared by chlorination of 3-amino-pyrazinoic acid esters with chlorine in aqueous acetic acid. Experience has shown that this chlorination results in the production of considerable quantities of nitrogen trichloride which is quite explosive, and indeed, experience has demonstrated that explosions do occur in such preparations. This dangerous aspect of the process seriously limits its utility, particularly if the product is required in large quantity.

Other methods of chlorinating 3-aminopyrazinoic acid derivatives such as with sulfuryl chloride or with chlorine in an aprotic solvent such as acetonitrile invariably cause chlorination at both the 5- and the 6-position resulting in 3-amino-5,6-dichloropyrazinoic acid derivatives. It was discovered as a feature of this invention that the desired 3-amino-6-chloropyrazinoic acid derivative can be prepared readily by treating such 3-amino-5,6-dichloropyrazinoic acid derivatives with hydrogen in the presence of a hydrogenation catalyst. This novel process has the advantage of utilizing readily available starting materials in a simple rapid process that is free from hazard under normal manufacturing conditions.

The process which forms the main embodiment of this invention comprises dissolving a 3-amino-5,6-dichloropyrazinoic acid derivative in an organic solvent in which the derivative is soluble such as an alcohol, advantageously methanol, ethanol or propanol, tetrahydrofuran or dimethylformamide which contains approximately 2 molar equivalents of a tertiary amine such as triethylamine, trimethylamine, N-methylpiperidine and the like. Since the tertiary amine acts only as an acceptor for the hydrogen chloride produced in the reaction, any amount from 1 molar equivalent to a reasonably large excess is usable or it may be omitted entirely when the starting material is a pyrazinoylguanidine or pyrazinamidoguanidine. To the solution so prepared is added a catalytic amount such as 0.25 g. to 1 g. of a hydrogenation catalyst such as platinum metal, Raney nickel, Raney cobalt or preferably palladium on carbon. Such catalysts are commercially available. This mixture is then treated with hydrogen at from 1 to about 5 atmospheres of pressure, preferably at about 3 atmospheres and at from 0° C. to about 100° C., but most conveniently at ambient temperature, that is about 20–25° C. until 1 to 1.15 molar equivalents of hydrogen have been absorbed, at which time the treatment with hydrogen must be terminated to prevent removal of the 6-chloro group.

From the several examples that follow demonstrating the utility of the novel process of this invention it is apparent that the nature of the substituent Z is not important in that it is not limiting on the novel process provided it does not present a functional group that is subject to facile hydrogenation or hydrogenolysis.

EXAMPLE 1

Hydrogenolysis with paladium on carbon

A solution of 3.3 g. (0.015 mole) of methyl 3-amino-5,6-dichloropyrazinoate and 3.06 g. (0.03 mole) of triethylamine in 30 ml. of dimethylformamide is hydrogenated over 0.5 g. of 5% palladium on carbon at 25° C. under 3 atmospheres of hydrogen pressure. After 6 minutes, a total of 1.15 molar equivalents of hydrogen is absorbed and the hydrogenation is stopped. The catalyst is removed by filtration and the filtrate is concentrated to about 5 ml. at 50–60° C. in high vacuum. Water (25 ml.) is added to the residue, the slurry is aged one-half hour at 0° C., and the product is collected on a filter and washed with a small amount of cold water. The product is recrystallized from 40 ml. of methanol to yield 1.75 g.

(62%) of methyl 3-amino-6-chloropyrazinoate, M.P. 155–158° C.

EXAMPLE 2

Hydrogenolysis with platinum

A solution of 0.015 mole of 3-amino-5,6-dichloropyrazinoylguanidine in 65 ml. of dimethylformamide is hydrogenated over 0.5 g. of platinum oxide at 25° C. under 1.5 atmospheres of hydrogen pressure. After a net volume of about 1.15 molar equivalents of hydrogen (adjusted for the volume consumed by the catalyst) is absorbed, the hydrogenation is stopped. After isolation of the product essentially as described in Example 1 there is obtained 3-amino-6-chloropyrazinoylguanidine hydrochloride, M.P. 286° C.

EXAMPLE 3

Hydrogenolysis with Raney nickel

A solution of 0.015 mole of 3-amino-5,6-dichloropyrazinamidoguanidine in 50 ml. of tetrahydrofuran is hydrogenated over 1 teaspoonful of Raney nickel at 25° C. under 2 atmospheres of hydrogen pressure. After a net volume of about 1.15 molar equivalents of hydrogen (adjusted for the volume of hydrogen consumed by the catalyst and solvent) is absorbed the hydrogenation is stopped. After isolation of the product essentially as described in Example 1, there is obtained 3-amino-6-chloropyrazinamidoguanidine hydrochloride, M.P. 277–278° C.

EXAMPLE 4

Hydrogenolysis with Raney cobalt

Employing the method essentially as described in Example 3, but replacing the Raney nickel with Raney cobalt, there is obtained 3-amino-6-chloropyrazinamidoguanidine hydrochloride, M.P. 277–278° C.

Using essentially the procedure described in the foregoing examples starting with the appropriate 3-amino-5,6-dichloropyrazinoic acid derivatives there are obtained the 3-amino-6-chloropyrazinoic acid derivatives identified in table below.

TABLE

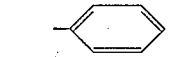

| Example | n | $R_2$ | $R_3$ | $R_4$ | M.P., °C. |
|---|---|---|---|---|---|
| 5 | 1 | H | H | $CH_3$ | 252–3 (HCl) |
| 6 | 1 | H | H | $-CH_2CH_2OH$ | 243–4 (HCl) |
| 7 | 1 | H | $CH_3$ | $CH_3$ | 279–80 (HCl) |
| 8 | 1 | H | H | —⟨phenyl⟩ | 254–5 (HCl) |
| 9 | 1 | H | H | $-NH_2$ | 266–7 (HCl) |
| 10 | 1 | H | H | $-CH_2CH_2$—⟨phenyl⟩ | 248–9 (HCl) |
| 11 | 0 | ⟨phenyl⟩— | H | —⟨phenyl⟩ | 224–6 |
| 12 | 0 | H | H | $CH_3$ | 235–6 |
| 13 | 0 | $CH_3$ | H | $CH_3$ | 226–7 |
| 14 | 0 | H | $CH_3$ | $CH_3$ | 198–9 |
| 15 | 0 | H | H | —⟨phenyl⟩ | 215–16 |
| 16 | 0 | H | H | $CH_2CH_2$—⟨phenyl⟩ | 214–15 |
| 17 | 0 | $-(CH_2)_3-$ | | H | 238 |
| 18 | 0 | $-(CH_2)_2-$ | | H | 225–26 |
| 19 | 0 | H | | $-(CH_2)_5-$ | 219–20 |
| 20 | 0 | H | H | —⟨phenyl⟩—Cl | 227–8 |
| 21 | 0 | H | H | $(CH_2)_2N(CH_2)_7$ | 167–8 |
| 22 | 0 | H | H | $CH_2CH_2OH$ | 196–7 |
| 23 | 0 | H | $CH_3(CH_2)_3$ | $CH_3(CH_2)_3-$ | 143–45 |
| 24 | 0 | $HOCH_2CH_2-$ | H | H | |

What is claimed is:

1. A process for the preparation of 3-amino-6-chloropyrazinoic acid derivatives of formula

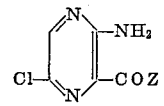

wherein Z is a member selected from the group consisting of:

(a) lower alkoxy and (b) 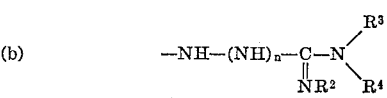

wherein $n$ is zero or one;

$R^2$ is a member selected from the group consisting of:
  (a) hydrogen,
  (b) lower alkyl, and
  (c) hydroxyloweralkyl;

and $R^3$ and $R^4$ each is a member selected from the group consisting of:
  (a) hydrogen,
  (b) lower alkyl, (c) substituted lower alkyl wherein the substituent is selected from the group consisting of:
(1) hydroxy,
(2) phenyl, and
(3) heterocyclic, selected from the group consisting of N-octahydroazocinyl and piperidino;
(d) phenyl,
(e) halophenyl, and
(f) amino, provided they are not both amino;
which comprises treating a 3-amino-5,6-dichloropyrazinoic acid derivative of formula

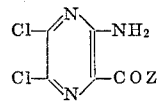

dissolved in an organic solvent selected from the group consisting of a lower alkanol, tetrahydrofuran and dimethylformamide with hydrogen in the presence of a hydrogenation catalyst selected from the group consisting of platinum metal, Raney nickel, Raney cobalt and palladium on carbon.

2. A process as claimed in claim 1 wherein a tertiary amine selected from the group consisting of tri(lower alkyl)amine, and N-methylpiperidine is employed as an acid acceptor.

3. A process as claimed in claim 1 wherein said hydrogenation catalyst is palladium on carbon.

4. A process as claimed in claim 1 wherein Z is lower alkoxy.

5. A process as claimed in claim 2 wherein Z is lower alkoxy.

6. A process for the preparation of lower alkyl 3-amino-6-chloropyrazinoate which comprises treating lower alkyl 3-amino-5,6-dichloropyrazinoate in dimethylformamide and a tertiary amine with hydrogen in the presence of a palladium on carbon catalyst.

7. A process for the preparation of a 3-amino-6-chloropyrazinoylguanidine which comprises treating a 3-amino-5,6-dichloropyrazinoylguanidine in dimethylformamide with hydrogen in the presence of a palladium on carbon catalyst.

8. A process for the preparation of a 3-amino-6-chloropyrazinamidoguanidine which comprises treating a 3-amino-5,6-dichloropyrazinamidoguanidine in dimethylformamide with hydrogen in the presence of a palladium on carbon catalyst.

References Cited

UNITED STATES PATENTS

| | | | |
|---|---|---|---|
| 3,158,612 | 11/1964 | Bernardi et al. | 260—250 |
| 3,185,686 | 5/1965 | Camerino et al. | 260—250 |
| 3,300,494 | 1/1967 | Cragoe | 260—250 |

ALEX MAZEL, Primary Examiner

R. V. RUSH, Assistant Examiner

U.S. Cl. X.R.

260—999